US012173731B2

(12) United States Patent
Ishikawa et al.

(10) Patent No.: US 12,173,731 B2
(45) Date of Patent: Dec. 24, 2024

(54) PRESSURE COMPENSATION VALVE

(71) Applicant: Komatsu Ltd., Tokyo (JP)

(72) Inventors: Satoshi Ishikawa, Tokyo (JP); Junichi Fukushima, Tokyo (JP); Keita Murakami, Tokyo (JP); Masateru Hachisuka, Tokyo (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 18/562,958

(22) PCT Filed: Aug. 3, 2022

(86) PCT No.: PCT/JP2022/029780
§ 371 (c)(1),
(2) Date: Nov. 21, 2023

(87) PCT Pub. No.: WO2023/032576
PCT Pub. Date: Mar. 9, 2023

(65) Prior Publication Data

US 2024/0263650 A1 Aug. 8, 2024

(30) Foreign Application Priority Data

Aug. 31, 2021 (JP) ................................ 2021-140952

(51) Int. Cl.
*F15B 11/16* (2006.01)
*F15B 13/02* (2006.01)
*F15B 13/04* (2006.01)

(52) U.S. Cl.
CPC .......... *F15B 11/163* (2013.01); *F15B 11/165* (2013.01); *F15B 13/026* (2013.01);
(Continued)

(58) Field of Classification Search
CPC .... F15B 11/163; F15B 11/165; F15B 13/026; F15B 13/0405; F15B 2211/30535
See application file for complete search history.

(56) References Cited

U.S. PATENT DOCUMENTS

| | | | | |
|---|---|---|---|---|
| 5,651,390 A * | 7/1997 | Ishihama | E02F 9/2225 | 91/518 |
| 5,813,309 A * | 9/1998 | Taka | F15B 11/05 | 91/447 |
| 10,801,525 B2 * | 10/2020 | Jadhav | F15B 11/166 | |

FOREIGN PATENT DOCUMENTS

| | | |
|---|---|---|
| JP | H07-293510 A | 11/1995 |
| JP | H10-205502 A | 8/1998 |

(Continued)

*Primary Examiner* — Michael Leslie
(74) *Attorney, Agent, or Firm* — Locke Lord LLP

(57) ABSTRACT

In a pressure compensation valve, a spool portion of a valve body is provided with a throttle passage that constantly communicates with a pump port. A case is provided with supply pressure communication passages to block space between the throttle passage and a load pressure chamber when a poppet portion closes space between the pump port and a cylinder port by biasing force of a load pressure spring, and that, meanwhile, communicate between the throttle passage and the load pressure chamber via a throttle hole when the spool portion moves in an opening direction by a predetermined stroke. A lead-out pressure chamber that presses the poppet portion in a closing direction in a case where an internal pressure increases is provided between the poppet portion and the case, and a lead-out pressure passage that constantly communicates with the cylinder port is connected to the lead-out pressure chamber.

2 Claims, 5 Drawing Sheets

(52) U.S. Cl.
CPC . *F15B 13/0405* (2013.01); *F15B 2211/20546* (2013.01); *F15B 2211/30535* (2013.01)

(56) References Cited

FOREIGN PATENT DOCUMENTS

| | | | |
|---|---|---|---|
| JP | 2003-294002 | A | 10/2003 |
| JP | 2013-40639 | A | 2/2013 |

* cited by examiner

PRESSURE COMPENSATION VALVE

TECHNICAL FIELD

The present disclosure relates to a pressure compensation valve.

BACKGROUND

For example, in a drive circuit that operates a plurality of hydraulic actuators with a single hydraulic pump, a pressure compensation valve is interposed between the hydraulic pump and each hydraulic actuator. For example, a pressure compensation valve described in Patent Literature 1 is provided as a pressure compensation valve of this type. The pressure compensation valve is configured such that a movable sleeve provided on an outer peripheral portion of a valve body appropriately operates to select a side having a higher pressure among a pressure of a lead-out port of the pressure compensation valve itself (load pressure of corresponding hydraulic actuator) and a control pressure from another pressure compensation valve and the selected pressure on the high pressure side is applied as a back pressure of the valve body. According to the drive circuit provided with the pressure compensation valve, even when load pressures of a plurality of hydraulic actuators are different from each other, it is possible to prevent a situation in which oil is supplied only to a hydraulic actuator on a low load pressure side.

CITATION LIST

Patent Literature

Patent Literature 1: Japanese Laid-open Patent Publication No. H10-205502

SUMMARY OF THE INVENTION

Problem to be Solved by the Invention

Meanwhile, when a plurality of hydraulic actuators simultaneously operates, a load pressure of each hydraulic actuator may change. In this case, this is not necessarily preferable in consideration of the responsiveness of a valve body since a back pressure applied to the valve body does not change unless a movable sleeve operates in the above-described pressure compensation valve. In particular, when a high load pressure is rapidly generated with respect to a hydraulic actuator having a low load pressure due to an influence of disturbance and the like, immediately closing the valve body is difficult, and there may arise a problem of, for example, application of a high load pressure to a pressure supply source.

In view of the above-described circumstances, an object of the present disclosure is to provide a pressure compensation valve capable of improving responsiveness.

Means for Solving the Problem

To attain the object, according to the present disclosure, a pressure compensation valve for controlling supply of fluid from a lead-in port to a lead-out port based on a fluid supply pressure applied to the lead-in port and a control pressure applied to a load pressure chamber that presses a valve body in a closing direction in a case where an internal pressure increases, the pressure compensation valve including: a case including the lead-in port and the lead-out port; the valve body that opens and closes between the lead-in port and the lead-out port; and a load pressure spring that is interposed between the case and the valve body and that biases the valve body in a closing direction, the load pressure chamber being provided between the valve body and the case. Further, the valve body includes: a poppet portion that blocks a flow of fluid from the lead-out port to the lead-in port while allowing a flow of fluid from the lead-in port to the lead-out port; and a spool portion slidably disposed in a case with a proximal end facing the load pressure chamber, a distal end of the spool portion being kept in contact with the poppet portion by biasing force of the load pressure spring, the spool portion is provided with a throttle passage that constantly communicates with the lead-in port and that opens toward a sliding portion with respect to the case, the case is provided with a supply pressure communication passage that is closed by the spool portion to block space between the throttle passage and the load pressure chamber when the poppet portion closes space between the lead-in port and the lead-out port by biasing force of the load pressure spring, and that, meanwhile, communicates between the throttle passage and the load pressure chamber when the spool portion moves in an opening direction by a predetermined stroke, and a lead-out pressure chamber that presses the poppet portion in a closing direction in a case where an internal pressure increases is provided between the poppet portion and the case, and a lead-out pressure passage that constantly communicates with the lead-out port is connected to the lead-out pressure chamber.

Effect of the Invention

The present disclosure is advantageous in terms of responsiveness of a valve body since a side having a higher pressure among a pressure of a lead-out port of a host pressure compensation valve and a control pressure from another pressure compensation valve is selected in accordance with the position of the valve body and the higher pressure is applied to a load pressure chamber. Furthermore, when a pressure at the lead-out port rapidly increases with the valve body being opened, the pressure is applied to a lead-out pressure chamber through the lead-out pressure passage, and only a poppet portion immediately moves to a closing direction. Therefore, even when a high load pressure is rapidly generated with respect to a fluid pressure actuator having a low load pressure, there arises no problem of, for example, application of the high load pressure to a pressure supply source.

MODE FOR CARRYING OUT THE INVENTION

A preferred embodiment of a pressure compensation valve according to the present disclosure will be described in detail below with reference to the accompanying drawings.

Figure 1:
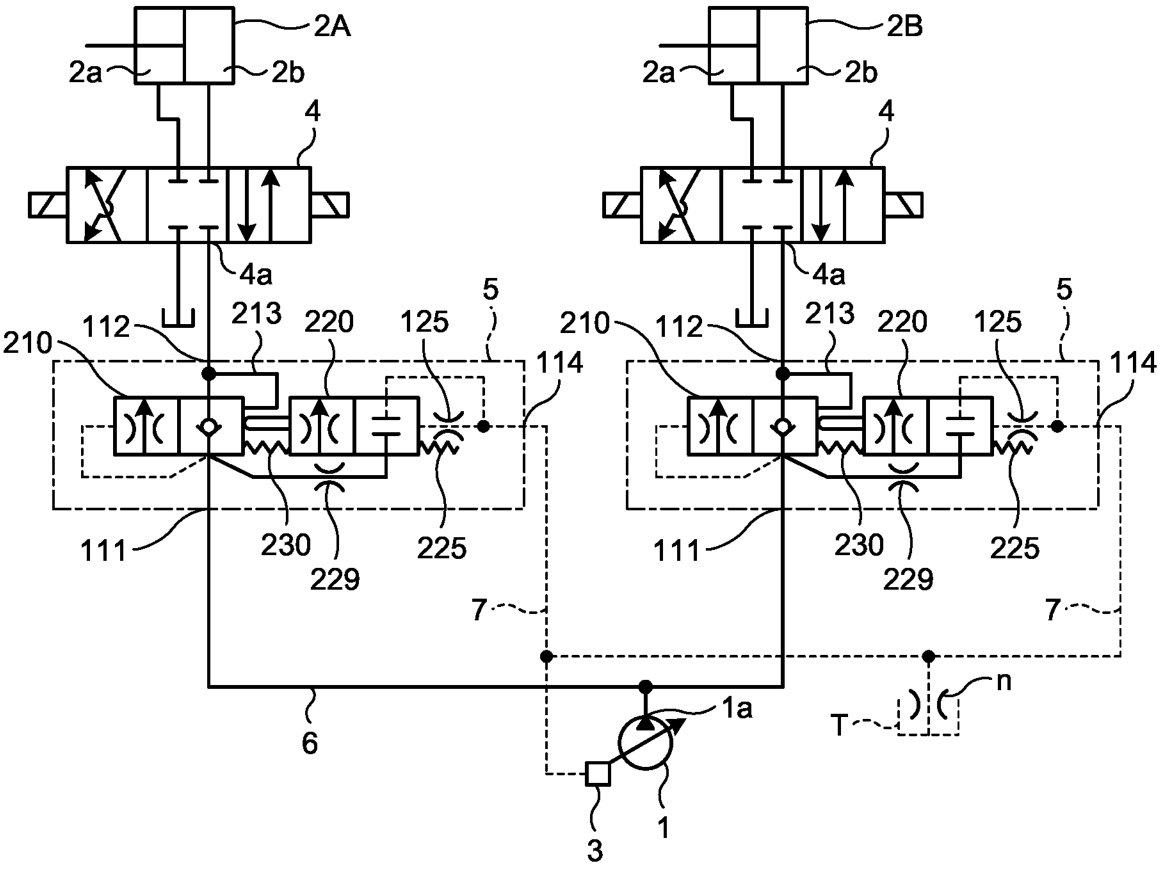
FIG. 1 illustrates a hydraulic drive circuit to which a pressure compensation valve according to an embodiment of the present disclosure is applied.

FIG. 1 illustrates a hydraulic drive circuit to which the pressure compensation valve according to the embodiment of the present disclosure is applied. The hydraulic drive circuit illustrated here operates two hydraulic cylinder actuators 2A and 2B with a single hydraulic pump 1. The hydraulic pump 1 is of a variable displacement type including a displacement setting unit 3 that changes a discharge amount in accordance with a given control pressure. The hydraulic cylinder actuators 2A and 2B are of double-acting types that operate by selectively supplying oil to rod chambers 2*a* and bottom chambers 2*b*. Direction switching valves 4 and pressure compensation valves 5 are provided between the hydraulic pump 1 and the hydraulic cylinder actuators 2A and 2B. The direction switching valves 4 are interposed between the hydraulic pump 1 and the hydraulic cylinder actuator 2A and between the hydraulic pump 1 and the hydraulic cylinder actuator 2B. The direction switching valves 4 selectively connect the hydraulic pump 1 to the rod chambers 2*a* and the bottom chambers 2*b* of the hydraulic cylinder actuators 2A and 2B. The pressure compensation valves 5 are interposed between the direction switching valves 4 and the hydraulic pump 1. The pressure compensation valves 5 control supply of oil to the hydraulic cylinder actuators 2A and 2B. The configurations of the pressure compensation valves 5 will be described in detail below, and characteristic parts of the present disclosure will be described together. Note that, the configurations of the pressure compensation valves 5 are common to the two hydraulic cylinder actuators 2A and 2B, so that the configuration of a pressure compensation valve 5 connected to the hydraulic cylinder actuator 2A will be described below.

Figure 2:
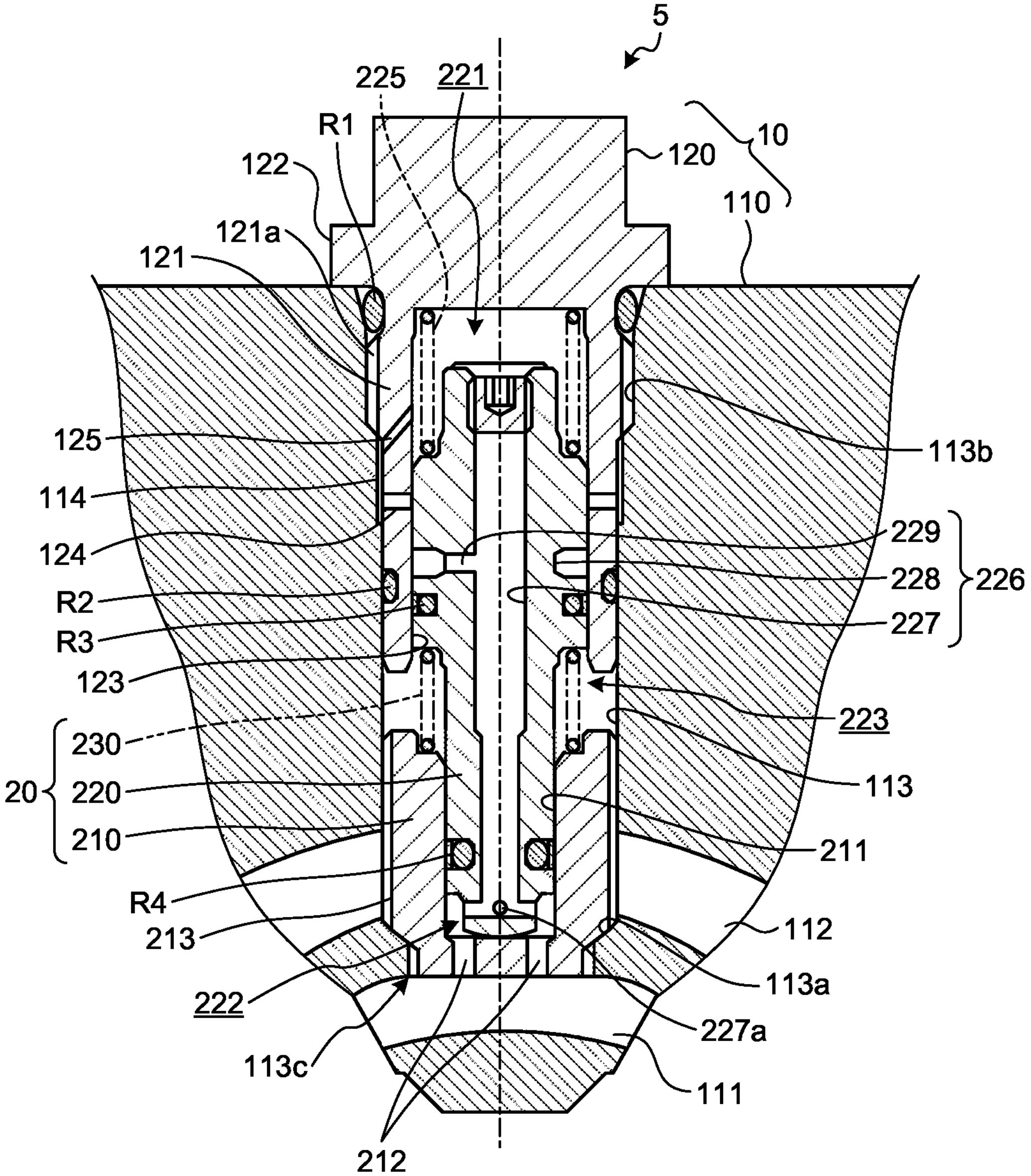
FIG. 2 is a cross-sectional view illustrating a structure of the pressure compensation valve in FIG. 1.

FIG. 2 illustrates a specific structure of the pressure compensation valve 5. As illustrated in the figure, the pressure compensation valve 5 of the embodiment includes a case 10 and a valve body 20.

The case 10 includes a case body 110 and a plug 120. The case body 110 includes a pump port (lead-in port) 111 and a cylinder port (lead-out port) 112, and includes a guide hole 113. The guide hole 113 communicates between the pump port 111 and the cylinder port 112. The plug 120 is mounted in the guide hole 113 of the case body 110.

As illustrated in FIG. 1, the pump port 111 of the case body 110 is connected to a discharge port 1*a* of the hydraulic pump 1 via a branch supply passage 6. The cylinder port 112 is connected to an input port 4*a* of a direction switching valve 4 via a supply passage. As illustrated in FIG. 2, the guide hole 113 communicates from the outer surface of the case body 110 to the pump port 111 via the cylinder port 112. A portion of the guide hole 113 communicating from the outer surface of the case body 110 to the cylinder port 112 has a substantially constant inner diameter. A tapered valve seat 113*a* is formed in a portion of the guide hole 113 from the cylinder port 112 to the pump port 111 so that the inner diameter gradually decreases toward the pump port 111. An internal screw groove 113*b* is formed in a portion of the guide hole 113 close to the outer surface of the case body 110.

The plug 120 includes a columnar insertion portion 121 and a flange portion 122. The insertion portion 121 has an outer diameter to be fitted into the guide hole 113 of the case body 110. The flange portion 122 has a large diameter, and is provided at a proximal end of the insertion portion 121. An external screw 121*a* is provided in an outer peripheral portion of the insertion portion 121 close to the flange portion 122. The dimension along the axial center of the insertion portion 121 is set to be shorter than the guide hole 113. The plug 120 is attached to the case body 110 with the flange portion 122 abutting on the outer surface by inserting a distal end of the insertion portion 121 into the guide hole 113 and screwing the external screw 121*a* into the internal screw groove 113*b* of the guide hole 113. As is clear from the figure, a distal end surface of the insertion portion 121 terminates on a front side of the cylinder port 112.

A spool hole 123, a first passage 124, and a second passage 125 are provided in the insertion portion 121 of the plug 120 described above. The spool hole 123 is a void with a circular cross section formed from an end surface of the insertion portion 121 along the axial center of the insertion portion 121, and has a constant inner diameter. The inner diameter of the spool hole 123 is set to be the same as or smaller than the inner diameter of a portion 113*c* of the guide hole 113 which opens to the pump port 111. Each of the first passage 124 and the second passage 125 is a small-diameter hole penetrating from the outer peripheral surface of the insertion portion 121 to the inner peripheral surface of the spool hole 123. The first passage 124 radially extends so as to be substantially perpendicular to the axial center of the insertion portion 121, and is formed at a portion of the insertion portion 121 on the distal end side of the external screw 121*a*. In the illustrated example, a plurality of first passages 124 is radially formed. The second passage 125 extends obliquely so as to gradually approach the proximal end side from the outer peripheral surface of the insertion portion 121 toward the center. Only one second passage 125 is formed in the insertion portion 121 such that an opening on the outer peripheral surface is located between the first passage 124 and the external screw 121*a*. The first passage 124 and the second passage 125 communicate with each other via a load pressure port 114 provided at a portion of the case body 110 on the distal end side of the internal screw groove 113*b*. The load pressure port 114 is an annular void formed at the time when the insertion portion 121 of the plug 120 is fitted into the guide hole 113 by providing a recess on the inner peripheral surface of the guide hole 113. As illustrated in FIG. 1, the load pressure port 114 mutually communicates with the load pressure port 114 of the pressure compensation valve 5 provided in another hydraulic cylinder actuator 2B through a load pressure passage 7. Moreover, the load pressure passage 7 is connected to the displacement setting unit 3 of the hydraulic pump 1, and communicates with a tank T via a tank throttle n. Note that, reference signs R1 and R2 in FIG. 2 denote oil seals provided between the guide hole 113 of the case body 110 and the insertion portion 121 of the plug 120.

The valve body 20 operates with respect to the case 10 to open and close between the pump port 111 and the cylinder port 112. In the embodiment, the valve body 20 includes a poppet portion 210, a spool portion 220, and a load check spring 230.

The poppet portion 210 allows oil to be supplied from the pump port 111 to the cylinder port 112, and blocks a flow of oil from the cylinder port 112 to the pump port 111. In the embodiment, the poppet portion 210 having a columnar shape in which the proximal end is fitted into the guide hole 113 and a tapered shape in which the distal end is in surface contact with the valve seat 113*a* is applied. The poppet portion 210 is slidably fitted into the guide hole 113 via the proximal end, and can move along the axial center thereof by using the guide hole 113 as a guide. That is, the dimension along the axial center of the poppet portion 210 is set such that a gap is generated between the poppet portion 210 and the distal end of the plug 120 even in a state where the poppet portion 210 abuts on the valve seat 113*a* and the poppet portion 210 can move and separated from the valve seat 113*a* by moving along the axial center of the guide hole 113. A fitting hole 211, a lead-in hole 212, and a lead-out pressure passage 213 are formed in the poppet portion 210.

The fitting hole 211 is opened only to a proximal end surface of a columnar portion of the poppet portion 210, has a circular shape having a cross section of a constant inner diameter, and is formed along the axial center of the poppet portion 210. The fitting hole 211 has an inner diameter smaller than the inner diameter of the spool hole 123 provided in the plug 120. The lead-in hole 212 opens to the distal end surface of the poppet portion 210 at one end, and opens to the fitting hole 211 at the other end. A plurality of lead-in holes 212 is formed at equal intervals on the circumference around the axial center of the poppet portion 210. The lead-in holes 212 function to constantly communicate between the pump port 111 and the fitting hole 211 even in a state in which the poppet portion 210 abuts on the valve seat 113*a*, that is, even in a case where the poppet portion 210 closes the space between the cylinder port 112 and the pump port 111. The lead-out pressure passage 213 is a groove-shaped cutout, extending along the axial center, formed on the outer peripheral surface of the poppet portion 210. A plurality of lead-out pressure passages 213 is formed on the outer peripheral surface of the poppet portion 210. The lead-out pressure passages 213 function to constantly communicate between the cylinder port 112 and space of a portion of the guide hole 113 located on the proximal end side of the poppet portion 210.

The spool portion 220 has a columnar shape having a circular cross section. The proximal end of the spool portion 220 is fitted into the spool hole 123 of the plug 120 to form a load pressure chamber 221 between the spool portion 220 and the plug 120. The distal end of the spool portion 220 has a smaller diameter than the proximal end thereof, and is slidably fitted into the fitting hole 211 of the poppet portion 210. Although not clearly illustrated in the figure, the gap between the fitting hole 211 and the distal end of the spool portion 220 is set to be larger than the gap between the spool hole 123 and the proximal end of the spool portion 220 and larger than the gap between the guide hole 113 and the poppet portion 210.

A portion of the most distal end of the spool portion 220 has a smaller outer diameter than the fitting hole 211, and constitutes a communication chamber 222 with the poppet portion 210. The communication chamber 222 constantly communicates with the lead-in hole 212 of the poppet portion 210 even in a state in which the distal end surface of the spool portion 220 abuts on the poppet portion 210. Furthermore, in the space between the distal end of the spool portion 220 and the guide hole 113, an annular lead-out pressure chamber 223 is formed between the plug 120 and the poppet portion 210. The lead-out pressure chamber 223 constantly communicates with the cylinder port 112 through the above-described lead-out pressure passage 213. The spool portion 220 has a dimension along the axial center set to be shorter than a distance from the fitting hole 211 of the poppet portion 210 abutting on the valve seat 113*a* to the proximal end surface of the spool hole 123, and can move along the axial center therebetween. Note, however, that the spool portion 220 is pressed by a load pressure spring 225 provided in the load pressure chamber 221. The distal end surface of the spool portion 220 is constantly kept in contact with the poppet portion 210.

Furthermore, a throttle passage 226 is provided in the spool portion 220. The throttle passage 226 includes an internal passage 227, an annular passage 228, and a throttle hole 229. The internal passage 227 has a linear shape formed in an axial center portion of the spool portion 220, and has a relatively large diameter. A proximal end of the internal passage 227 is closed while a distal end of the internal passage 227 communicates with the communication chamber 222 via a plurality of communication holes 227*a* along the radial direction. The annular passage 228 has an annular shape provided in a portion fitted into the spool hole 123 of the plug 120 on the outer peripheral surface of the spool portion 220, and is formed between the spool portion 220 and the plug 120. When the poppet portion 210 abuts on the valve seat 113*a* and the distal end surface of the spool portion 220 abuts on the poppet portion 210, the annular passage 228 is formed at a position closer to the distal end side than the first passage 124 provided in the plug 120. When the spool portion 220 moves to the proximal end side from this state, the annular passage 228 faces the first passage 124 before the proximal end of the spool portion 220 abuts on the plug 120, and can communicate with each other. The throttle hole 229 has a smaller diameter than the internal passage 227 and a larger inner diameter than the tank throttle n. Only one throttle hole 229 is formed in the spool portion 220 with the throttle hole 229 communicating from the annular passage 228 to the internal passage 227. In the figure, a reference sign R3 denotes a seal unit provided between the spool portion 220 and the plug 120, and a reference sign R4 denotes a seal unit provided between the spool portion 220 and the poppet portion 210. Those obtained by combining, for example, an O-ring with a ring made of polytetrafluoroethylene (PTFE) can be applied as the seal units R3 and R4.

The load check spring 230 is interposed between the poppet portion 210 and the spool portion 220 in the lead-out pressure chamber 223. When the cylinder port 112 has a negative pressure or when vibration is applied to the case body 110, the load check spring 230 prevents an unintentional movement of the poppet portion 210. In the embodiment, the load check spring 230 having a set load smaller than the load pressure spring 225 is applied.

Figure 3:
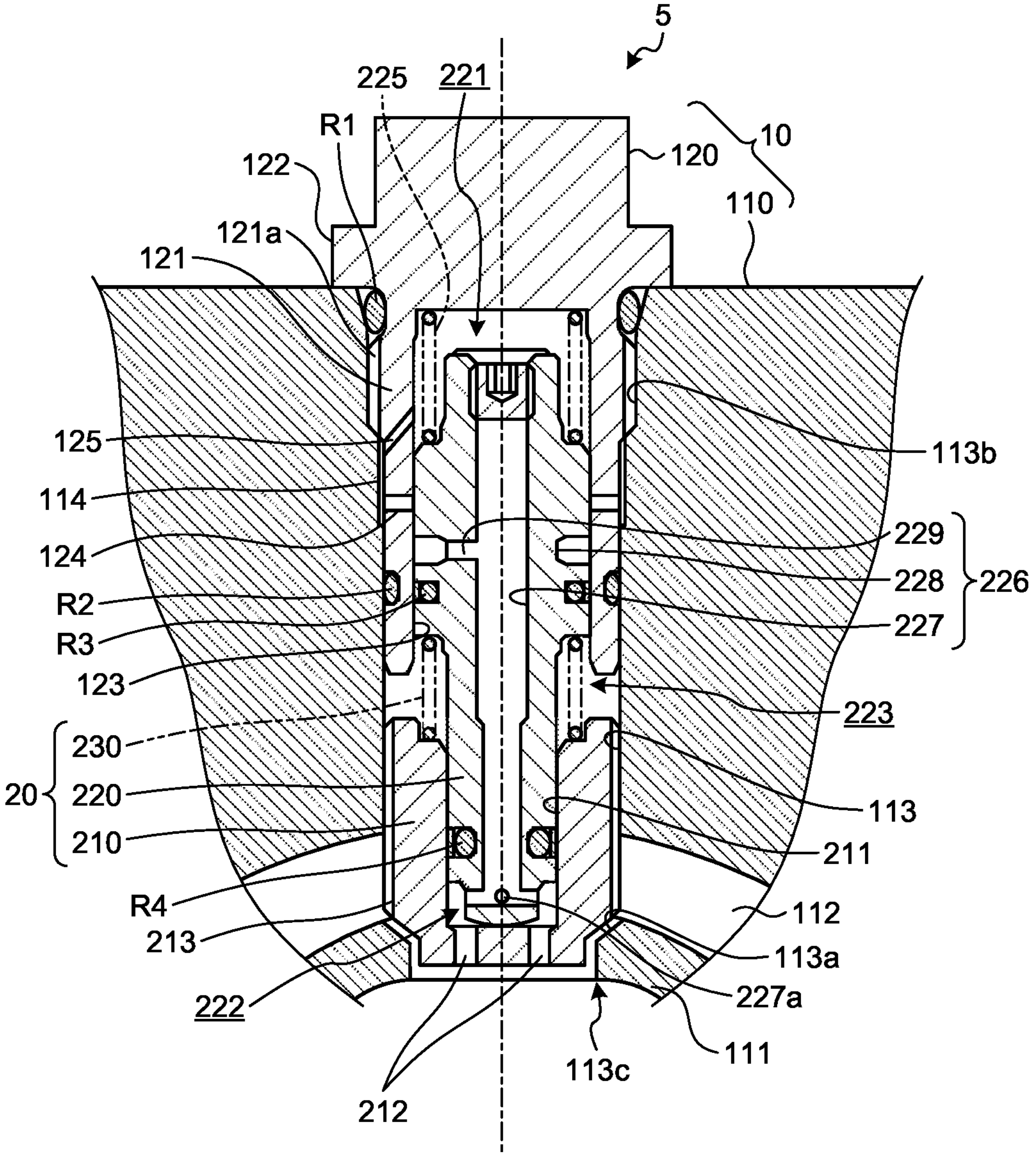
FIG. 3 is a cross-sectional view of a valve body that starts to open in the pressure compensation valve in FIG. 2.

As illustrated in FIG. 2, in the pressure compensation valve 5 configured as described above, even when the poppet portion 210 closes the pump port 111, the throttle passage 226 and the pump port 111 communicate with each other via the lead-in hole 212, the communication chamber 222, and the communication hole 227*a*. In this state, however, the insertion portion 121 closes the throttle hole 229, so that the space between the load pressure chamber 221 and the throttle passage 226 is blocked. As a result, as illustrated in FIG. 1, the load pressure chamber 221 has a tank pressure through the second passage 125, the load pressure port 114, and the load pressure passage 7. That is, in the state in FIG. 2, only biasing force of the load pressure spring 225 functions as force for operating the valve body 20 in a closing direction, and the valve body 20 moves in an opening direction without resisting the pressure of the load pressure chamber 221. Therefore, even in consideration of an influence of flow force acting by the flow of fluid at the time when the poppet portion 210 starts to open, the valve body 20 can be moved in the opening direction as illustrated in FIG. 3 at a stage where the pump port 111 has a low supply pressure. Horsepower loss of the hydraulic pump 1 can be reduced.

Figure 4:
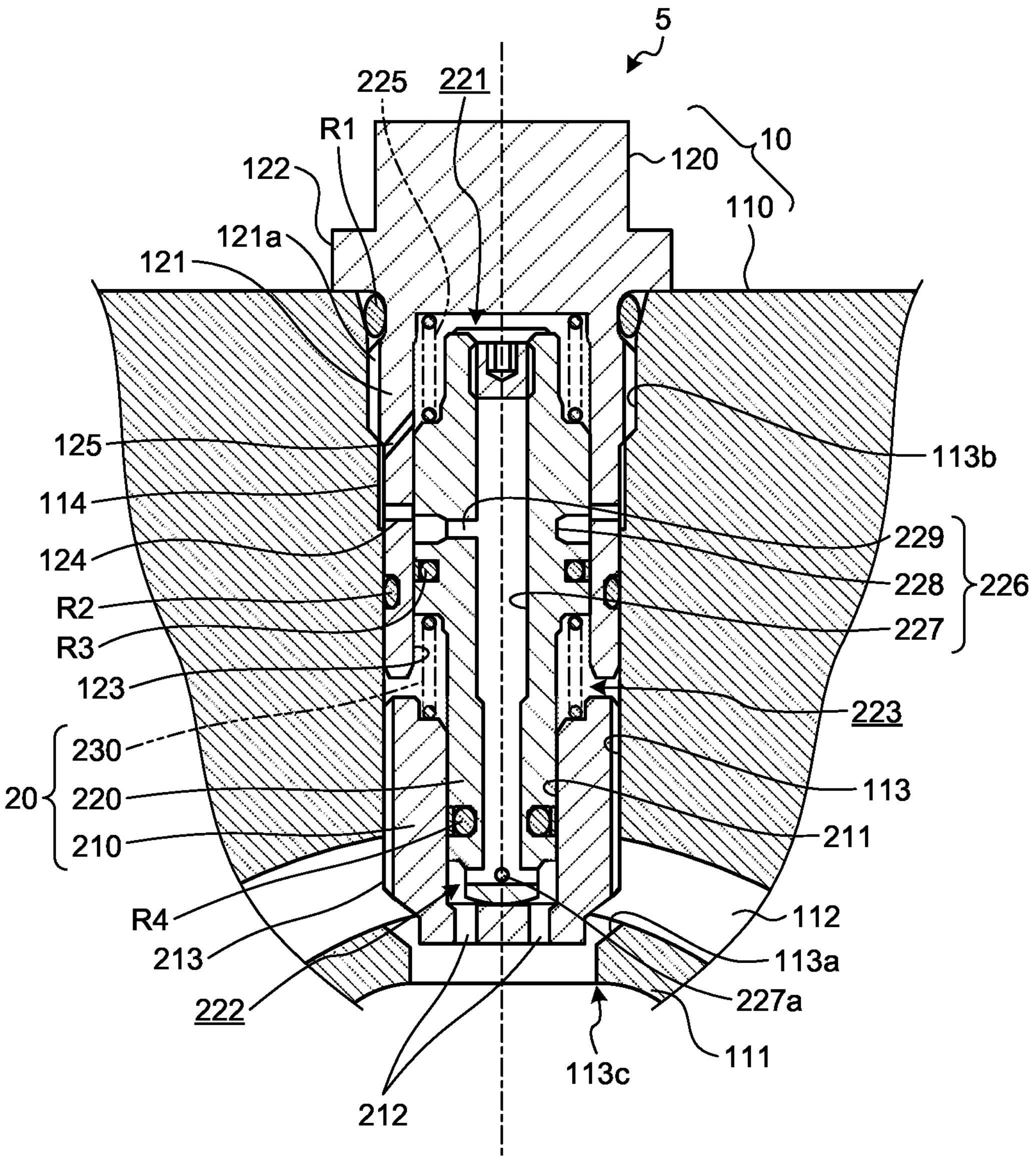
FIG. 4 is a cross-sectional view illustrating a state in which the valve body opens in the pressure compensation valve in FIG. 2 and a throttle passage communicates with a load pressure chamber.
Figure 5:
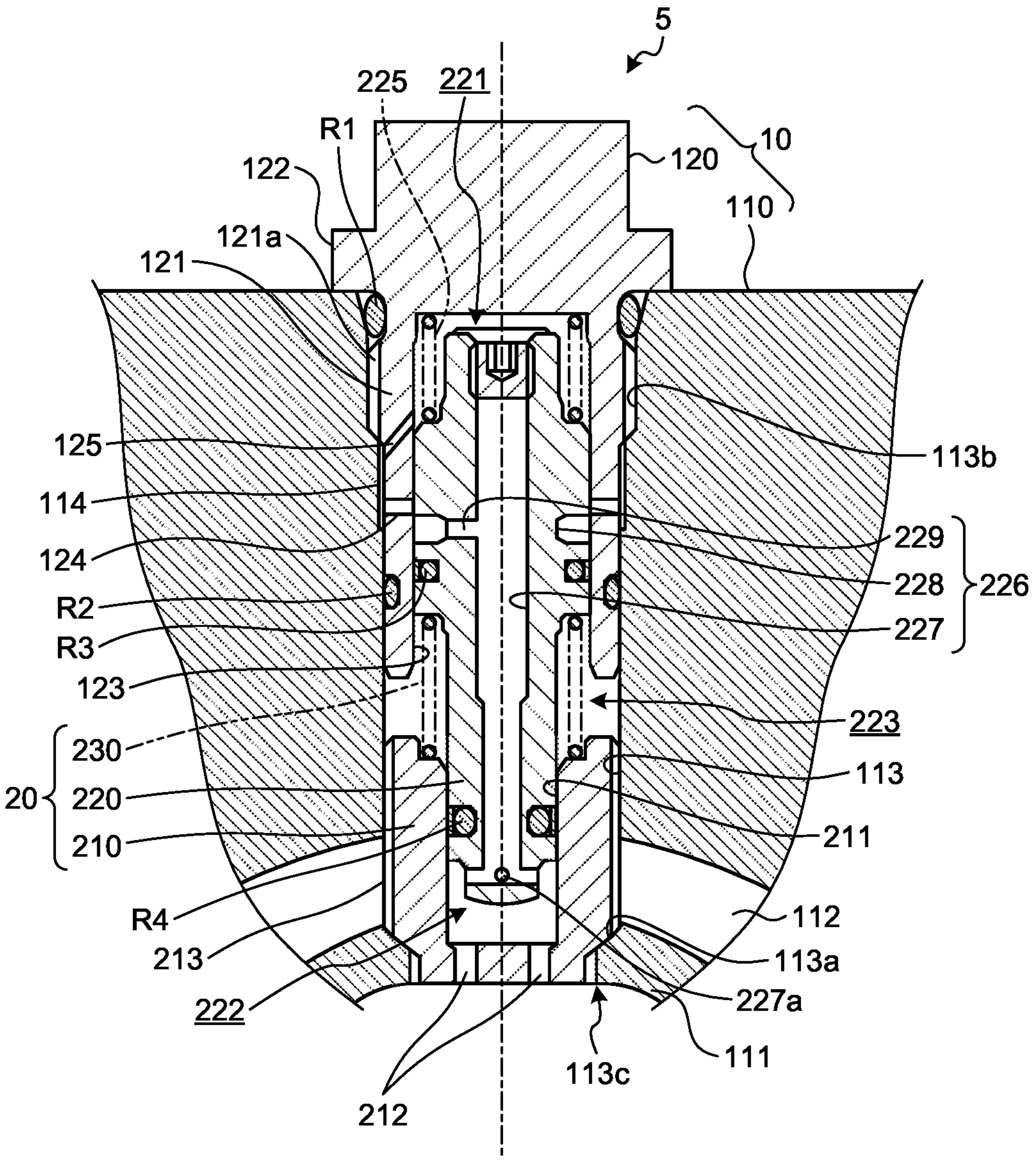
FIG. 5 is a cross-sectional view of a poppet portion closed from the state in FIG. 4.

When the movement of the valve body 20 in the opening direction from the state in FIG. 3 proceeds and the annular passage 228 comes to a position facing the first passage 124 as illustrated in FIG. 4, the throttle passage 226 communicates with the load pressure chamber 221 via the first passage 124, the load pressure port 114, and the second passage 125. As described above, the throttle passage 226 communicates with the pump port 111 through the communication hole 227*a*, the communication chamber 222, and the lead-in hole 212. Therefore, in the state in FIG. 4, the supply pressure of the pump port 111 is applied to the load pressure chamber 221. Biasing force generated by the pressure of the load pressure chamber 221 and biasing force of the load pressure spring 225 act in the direction in which the valve body 20 is closed. This causes the valve body 20 to appropriately operate by the balance between the biasing force generated by the supply pressure (load pressure of hydraulic cylinder actuator 2A) of the pump port 111 and the biasing force generated by the pressure of the load pressure chamber 221 and the biasing force of the load pressure spring 225. A flow rate of oil supplied to the hydraulic cylinder actuator 2A is controlled.

Here, in the hydraulic drive circuit in FIG. 1, load pressure ports 114 of two pressure compensation valves 5 communicate with each other through the load pressure passage 7. Therefore, when the hydraulic cylinder actuators 2A and 2B perform combined operation, a supply pressure (load pressure) on the high pressure side is applied to the load pressure chambers 221 of the two pressure compensation valves 5. That is, in the pressure compensation valve 5 on a low supply pressure side, the valve body 20 moves in a closing direction by a supply pressure on a high pressure side applied to the load pressure chamber 221 through the load pressure port 114 and the second passage 125. Accordingly, the space between the load pressure chamber 221 and the throttle passage 226 is blocked. Therefore, even when load pressures of a plurality of hydraulic cylinder actuators 2A and 2B are different from each other, it is possible to prevent a situation in which oil is supplied only to a hydraulic cylinder actuator on a low load pressure side. Furthermore, the supply pressure is applied to the load pressure chamber 221 through the load pressure port 114 and the second passage 125, and an operating member is unnecessary in the middle, which is advantageous in terms of responsiveness.

Moreover, when the load pressure is reversed due to an influence of disturbance or the like during the combined operation of the hydraulic cylinder actuators 2A and 2B, that is, when the load pressure of the hydraulic cylinder actuator on the low load pressure side rapidly increases, the increased pressure of the cylinder port 112 is applied to the lead-out pressure chamber 223 through the lead-out pressure passage 213. As a result, the poppet portion 210 immediately moves in the closing direction, and the space between the cylinder port 112 and the pump port 111 is blocked, so that a situation in which a high load pressure is applied to the hydraulic pump 1 can be prevented.

Note that, although, in the above-described embodiment, the load check spring 230 is interposed between the poppet portion 210 and the spool portion 220, the load check spring 230 is not necessarily required to be provided. Furthermore, although the lead-out pressure passage 213 provided only in the poppet portion 210 is illustrated, a lead-out pressure passage may be provided in the case body 110 such that the cylinder port 112 constantly communicates with the lead-out pressure chamber 223, or the lead-out pressure passage may be provided in both the poppet portion 210 and the case body 110.

REFERENCE SIGNS LIST

5 PRESSURE COMPENSATION VALVE
10 CASE
20 VALVE BODY
110 CASE BODY
111 PUMP PORT
112 CYLINDER PORT
113 GUIDE HOLE
114 LOAD PRESSURE PORT
120 PLUG
124 FIRST PASSAGE
125 SECOND PASSAGE
210 POPPET PORTION
213 LEAD-OUT PRESSURE PASSAGE
220 SPOOL PORTION
221 LOAD PRESSURE CHAMBER
223 LEAD-OUT PRESSURE CHAMBER
225 LOAD PRESSURE SPRING
226 THROTTLE PASSAGE
227 INTERNAL PASSAGE
228 ANNULAR PASSAGE
229 THROTTLE HOLE

The invention claimed is:

1. A pressure compensation valve for controlling supply of fluid from a lead-in port to a lead-out port based on a fluid supply pressure applied to the lead-in port and a control pressure applied to a load pressure chamber that presses a valve body in a closing direction in a case where an internal pressure increases, the pressure compensation valve comprising: a case including the lead-in port and the lead-out port; the valve body that opens and closes between the lead-in port and the lead-out port; and a load pressure spring that is interposed between the case and the valve body and that biases the valve body in a closing direction, the load pressure chamber being provided between the valve body and the case, wherein the valve body includes: a poppet portion that blocks a flow of fluid from the lead-out port to the lead-in port while allowing a flow of fluid from the lead-in port to the lead-out port; and a spool portion slidably disposed in a state where a proximal end faces the load pressure chamber, a distal end of the spool portion being kept in contact with the poppet portion by biasing force of the load pressure spring, the spool portion is provided with a throttle passage that constantly communicates with the lead-in port and that opens toward a sliding portion with respect to the case, the case is provided with a supply pressure communication passage that is closed by the spool portion to block space between the throttle passage and the load pressure chamber in a case where the poppet portion closes space between the lead-in port and the lead-out port by biasing force of the load pressure spring, and that, meanwhile, communicates between the throttle passage and the load pressure chamber when the spool portion moves in an opening direction by a predetermined stroke, and a lead-out pressure chamber, which presses the poppet portion in a closing direction in a case where an internal pressure increases, is provided between the poppet portion and the case, and a lead-out pressure passage, which constantly communicates with the lead-out port, is connected to the lead-out pressure chamber.

2. The pressure compensation valve according to claim 1, wherein the case includes the lead-in port and the lead-out port, and includes: a case body having a guide hole that movably supports the poppet portion; and a plug mounted in the guide hole of the case body, the load pressure chamber being formed between the spool portion and the plug, the supply pressure communication passage includes: a load pressure port provided between the plug and the case body; a first passage that communicates with the load pressure port at one end and opens toward a sliding portion with respect to the spool portion in the plug at another end; and a second passage that communicates between the load pressure port and the load pressure chamber, and the first passage is provided at a position to communicate with the throttle passage in a case where the spool portion moves in an opening direction by a predetermined stroke.

* * * * *